United States Patent
Kurihara et al.

[11] Patent Number: 5,802,843
[45] Date of Patent: Sep. 8, 1998

[54] METHOD AND APPARATUS FOR DIAGNOSING ENGINE EXHAUST GAS PURIFICATION SYSTEM

[75] Inventors: Nobuo Kurihara, Hitachiota; Hiroshi Kimura; Yutaka Takaku, both of Hitachinaka; Toshio Ishii, Mito, all of Japan

[73] Assignee: Hitachi, Ltd., Tokyo, Japan

[21] Appl. No.: 386,659

[22] Filed: Feb. 10, 1995

[30] Foreign Application Priority Data

Feb. 10, 1994 [JP] Japan .................................. 6-016081

[51] Int. Cl.⁶ ........................................................ F01N 3/20
[52] U.S. Cl. ........................... 60/274; 60/277; 73/118.1
[58] Field of Search ............................... 60/277, 273, 299, 60/274, 276; 73/118.1

[56] References Cited

U.S. PATENT DOCUMENTS

| | | | |
|---|---|---|---|
| 4,656,829 | 4/1987 | Creps et al. | 60/277 |
| 5,158,063 | 10/1992 | Hosoda et al. | 123/676 |
| 5,303,168 | 4/1994 | Cullen et al. | 364/557 |
| 5,341,642 | 8/1994 | Kurihara et al. | 60/277 |
| 5,431,011 | 7/1995 | Casarella et al. | 60/277 |

FOREIGN PATENT DOCUMENTS

| | | |
|---|---|---|
| 0 626 507 A1 | 11/1994 | European Pat. Off. . |
| 41 22 787 A1 | 1/1992 | Germany . |
| 42 34 420 C1 | 4/1994 | Germany . |
| 4131762 | 5/1992 | Japan . |
| 5-171924 | 7/1993 | Japan . |
| WO 92/03642 | 3/1992 | WIPO . |
| WO 93/20340 | 10/1993 | WIPO . |

*Primary Examiner*—Douglas Hart
*Attorney, Agent, or Firm*—Evenson, McKeown, Edwards & Lenahan

[57] ABSTRACT

A diagnosis apparatus for diagnosing a catalytic converter of a motor vehicle as to whether the catalyst suffers deterioration by estimating a temperature of the catalyst or that of the exhaust gas in the vicinity of the catalyst on the basis of a plurality of engine parameters to thereby decide deterioration of the catalyst by using as an index the estimated temperature. The apparatus includes a unit for estimating the temperature of the catalyst in a steady state by making use of an engine speed and an engine load which represent typical parameters employed in fuel injection control of the engine. The steady-state temperature facility is realized by storing the engine speeds and the engine loads obtained experimentally in the steady state operation of the engine in the form of a two-dimensional data map. A unit for correcting the estimated temperature of the catalyst in the transient state is provided for correcting the catalyst temperature determined by the steady-state catalyst temperature estimating unit to thereby ensure correct estimation of the catalyst temperature even in the course of operation of the motor vehicle. In the transient temperature estimating unit, non-linear characteristics are each described by combining a plurality of linear characteristics. A unit for estimating the temperature of the catalyst on the basis of the value determined by the steady-state temperature estimating unit and the transient-state temperature estimating unit is provided to decide deterioration of the catalyst.

3 Claims, 4 Drawing Sheets

METHOD AND APPARATUS FOR DIAGNOSING ENGINE EXHAUST GAS PURIFICATION SYSTEM

CROSS-REFERENCE TO RELATED APPLICATION

The present application relates to subject matter described in application Ser. No. 994,344 filed on Dec. 21, 1992 entitled "SYSTEM FOR DIAGNOSING ENGINE EXHAUST GAS PURIFYING DEVICE AND SYSTEM FOR DIAGNOSING SENSOR" and issued as U.S. Pat. No. 5,341,642 on Aug. 30, 1994. The disclosure of that application is incorporated herein by reference.

BACKGROUND OF THE INVENTION

The present invention relates to a method and apparatus for diagnosing an engine exhaust gas purification system in which an air-fuel ratio sensor or oxygen sensor (hereinafter referred to as the air-fuel ratio sensor or $O_2$-sensor representatively) and a catalytic converter are employed.

The system for purifying the exhaust gas of an internal combustion engine (hereinafter also referred to simply as the engine) is primarily comprised of a catalytic converter and an air-fuel ratio feedback apparatus. The catalytic converter is disposed in an exhaust pipe for eliminating HC (hydrocarbon), $NO_x$ (oxides of nitrogen) and CO (carbon monoxide) contained in the exhaust gas discharged from the engine. On the other hand, the air-fuel ratio feedback control apparatus is installed for controlling the amount of fuel injected to the engine by making use of an output signal of an oxygen sensor disposed in the exhaust pipe upstream of the catalytic converter for thereby maintaining the air-fuel ratio essentially at a constant level because the air-fuel ratio has to be held constant in order that the catalytic converter works most efficiently. In the case of a three-way catalyst system, degradation in the performance in the oxygen sensor disposed upstream of the catalytic converter causes the air-fuel ratio to deviate from a narrow range predetermined around a center value given by the stoichiometric air-fuel ratio, as a result of which the conversion efficiency of the catalytic converter for converting the HC, CO and $NO_x$ components of the exhaust gas to harmless components undergoes degradation. Besides, deterioration of the performance of the catalytic converter itself will be accompanied with degradation in the efficiency of conversion even when the air-fuel ratio is controlled accurately. As a technique for diagnosing the catalytic converter as to whether it suffers deterioration in the conversion performance or capability, there may be mentioned a diagnosis system disclosed, for example, in JP-A-5-171924 and the corresponding U.S. Pat. No. 5,341,642. More specifically, this publication disclose an apparatus for diagnosing an engine exhaust gas purifying system, which is comprised of an upstream air-fuel ratio sensor for detecting an air-fuel ratio at a location upstream of a catalytic converter as viewed in the exhaust gas flowing direction, a downstream air-fuel ratio sensor for detecting an air-fuel ratio within the exhaust pipe at a location downstream of the catalytic converter, a characteristic waveform extracting means for attenuating signal components of a frequency band which is lower than a air-fuel ratio control signal frequency band of an air-fuel ratio control means in the output signals of the upstream air-fuel ratio sensor and the downstream air-fuel ratio sensor, a means for arithmetically determining a correlation function of the signal passed through the characteristic waveform extracting means, and a catalyst state decision means for deciding the state of deterioration of the catalytic converter on the basis of values of the correlation function.

The performance of the catalytic converter is susceptible to the influence exerted by the temperature of the catalyst. When this temperature is low, the conversion efficiency becomes lowered. Accordingly, unless the temperature of the catalyst is taken into consideration in diagnosing the performance of the catalytic converter, an erroneous or false diagnosis will undesirably be resulted because lowering of the conversion efficiency of the catalytic converter under the influence of a change in the temperature thereof which is affected by the engine speed (rpm) and engine operation state such as an engine load level may erroneously be decided as deterioration in the performance of the catalytic converter. For solving this problem, it is required to install a temperature sensor for correcting the result of the diagnosis, as is disclosed in JP-A-5-171924 and corresponding U.S. Pat. No. 5,341,642. However, the catalyst temperature sensor mentioned above has to be implemented so as to cover a very wide range of temperatures for measurement on the order of 0° C. to 800° C., which involves high expensiveness in manufacturing the diagnosis apparatus, giving rise to another problem.

The problem mentioned just above may be solved by estimating the temperature of the catalytic converter on the basis of a signal measured for other purpose in place of the installing the catalyst temperature sensor. In this conjunction, it should however be mentioned that the means for allowing the catalyst temperature to be measured with high or satisfactory accuracy required for diagnosing the catalytic converter as to deterioration in the performance thereof has been neither proposed nor realized heretofore.

SUMMARY OF THE INVENTION

In the light of the state of the art described above, it is an object of the present invention to provide a method and an apparatus which are capable of diagnosing deterioration of a catalytic converter which constitutes a major part of an engine exhaust gas purification system without fail by estimating accurately the catalyst temperature in the course of normal running of a motor vehicle.

It is an object of the present invention to provide a method and an apparatus for diagnosing an engine exhaust gas purification system which are capable of diagnosing with high accuracy the catalytic converter as to occurrence of deterioration in the performance thereof by estimating the catalyst temperature in the course of running an internal combustion engine.

In view of the above and other objects which will become apparent as the description proceeds, it is proposed according to a general aspect of present invention that a plurality of engine operation parameters are detected, either a temperature of a catalyst or temperature of an engine exhaust gas at a location in the vicinity of the catalyst is determined on the basis of the engine operation parameters, and that deterioration of the catalyst is decided by using as indexes the catalyst temperature or the exhaust gas temperature in the vicinity of the catalyst.

In a preferred mode for carrying out the present invention, there is provided a unit for estimating the temperature of the catalyst in a steady state by making use of an engine speed (rpm) and an engine load which represent typical parameters employed in the fuel injection control of the internal combustion engine. The steady-state temperature estimating unit mentioned above can easily be realized by storing the engine speeds (rpm) and the engine loads obtained experimentally by operating the engine in the steady state in the form of a two-dimensional data map. Additionally, a unit for estimating the temperature of the catalyst in the transient state of the engine is provided for correcting the catalyst temperature determined by the steady-state catalyst temperature estimating unit for thereby ensuring correct estimation of the catalyst temperature even in the course of operation of the motor vehicle equipped with the engine. In the transient temperature estimating unit mentioned above, non-linear characteristics are each described by combining a plurality of linear characteristics. Further provided is a unit for estimating the temperature of the catalyst on the basis of the value determined by the steady-state temperature estimating unit and the transient-state temperature estimating unit for thereby deciding whether or not the catalyst suffers deterioration. With the arrangement described above, there can be realized a diagnosing apparatus which is capable of diagnosing with high accuracy and reliability the catalyst of the engine exhaust gas purification system as to whether or not the catalyst suffers deterioration in the performance or capability thereof.

In the diagnosis apparatus for the engine exhaust gas purification system mentioned above, it is preferred to provide a dead time setting unit for taking into account a temperature rise due to latent heat of moisture resident in the catalyst and associated piping at the time of starting the engine for thereby increasing the accuracy of the estimation of the catalyst temperature as performed on the basis of the outputs of the steady-state catalyst temperature estimating unit and the transient-state catalyst temperature estimating unit.

Furthermore, it is preferred to provide in association with the transient-state catalyst temperature estimating unit a facility for changing over delay time constants between a catalyst temperature rising process in which the catalyst is heated by the exhaust gas and a catalyst temperature lowering process in which the catalyst heat is dissipated to the atmosphere.

In another preferred mode for carrying out the invention, the diagnosis apparatus for the engine exhaust gas purification system should include a unit for correcting the estimated catalyst temperature in dependence on change or changes in the engine cooling water temperature, intake air temperature and/or the vehicle speed.

In a process for executing the catalyst deterioration diagnosis according to the invention, diagnosis of the catalyst itself is performed. To this end, a method disclosed in U.S. Pat. No. 5,341,642 may be utilized.

More specifically, by providing an upstream air-fuel ratio sensor at a position upstream of the catalyst and a downstream air-fuel ratio sensor disposed downstream of the catalyst, the air-fuel ratios are detected at locations upstream and downstream of the catalyst, respectively, under the timing determined by a crank angle signal generated by an crank angle detector which may be conventional one usually provided in the engine. In the output air-fuel ratio signals thus obtained, those signal components which falls within a lower frequency band than that employed for the air-fuel ratio control are attenuated by a characteristic waveform extracting unit.

On the other hand, an autocorrelation function calculating unit arithmetically determines an autocorrelation function $\phi_{xx}$ of the signal passed through the characteristic waveform extracting unit, while a cross-correlation function calculating unit determines a cross-correlation function $\phi_{xy}$ between the output signal of the upstream air-fuel ratio sensor and the output signal of the downstream air-fuel ratio sensor, both of which signals have passed through the characteristic waveform extracting unit mentioned above.

A deterioration index calculating unit determines a ratio between a maximum value $(\phi_{xy})_{max}$ of the cross-correlation function $\phi_{xy}$ and the maximum value $(\phi_{xx})$ of the autocorrelation function, respectively, during every predetermined period, to thereby output successive or sequential deterioration indexes $\Phi_i$. By determining a mean value from a predetermined number of the sequential deterioration indexes $\Phi_i$ calculated in this manner, there is outputted an ultimate deterioration index represented by the mean value.

In a preferred mode for carrying out the invention, the engine speed (rpm) and the intake air flow are detected to thereby determine the temperature of the catalyst when the engine operation state is stable (i.e., the engine speed and the engine load are in steady state). On the other hand, the transient-state catalyst temperature estimating unit determines the catalyst temperature in dependence on the engine operation states through cooperation with the dead time setting unit for taking into account the temperature rise at the start of engine operation as mentioned previously. Subsequently, the estimated catalyst temperature is corrected by taking into account the changes in the engine cooling water temperature, intake air temperature and the vehicle speed by the estimated catalyst temperature correcting unit. In this manner, the temperature of the catalyst can be estimated or determined with high accuracy without need for providing a sensor destined for this end.

When it is decided by a catalyst temperature comparison unit that the estimated catalyst temperature determined in this way exceeds a predetermined value, a deterioration indicating index is outputted as the result of the diagnosis.

BRIEF DESCRIPTION OF THE EMBODIMENTS

In the course of the description which follows, reference is made to the drawings, in which.

DESCRIPTION OF THE PREFERRED EMBODIMENTS

Now, the present invention will be described in detail in conjunction with what is presently considered as preferred or exemplary embodiments thereof by reference to the drawings.

In the first place, description will be made of the basic concept underlying the present invention by reference to FIG. 1.

It should first be mentioned that the diagnosis apparatus according to the instant embodiment of the invention is designed for diagnosing an exhaust gas purification system which is comprised of a catalytic converter 2 and air-fuel ratio sensors 3 and 4 disposed upstream and downstream of the catalytic converter 2, respectively, for controlling the fuel injection through a air-fuel ratio feedback control by making use of the output of the $O_2$ sensor 3. Hereinafter, the air-fuel ratio sensor 3 will also be referred to as the upstream $O_2$-sensor with the air-fuel ratio sensor 4 being referred to as the downstream $O_2$-sensor 4.

In the diagnosis apparatus according to the instant embodiment of the invention, perturbation of the air-fuel ratio brought about by the air-fuel ratio feedback control is made use of as a test signal for diagnosing the catalytic converter as to whether or not it suffers deterioration in the performance. In this conjunction, it is to be noted that unless the catalytic converter 2 suffers deterioration in the performance or capability thereof, the air-fuel ratio detected by the downstream $O_2$-sensor 4 is less susceptible to the perturbation owing to the catalytic oxidation and reduction effected by the catalytic converter 2. On the other hand, when the catalytic converter 2 suffers deterioration in the performance, the perturbation of the air-fuel ratio detected by downstream $O_2$-sensor 4 approximates to that of the air-fuel ratio detected by the upstream $O_2$-sensor 3. According to the teachings of the present invention, the diagnosis of the catalytic converter as to deterioration in the performance or capability thereof is realized by taking advantage of the similarity between the perturbations of the air-fuel ratios detected upstream and downstream of the catalytic converter, respectively.

Evaluation of the similarity of the perturbations mentioned above is carried out by using a correlation function.

Now, the description will be directed to a catalytic converter diagnosing method according to an embodiment of the invention.

Figure 1:
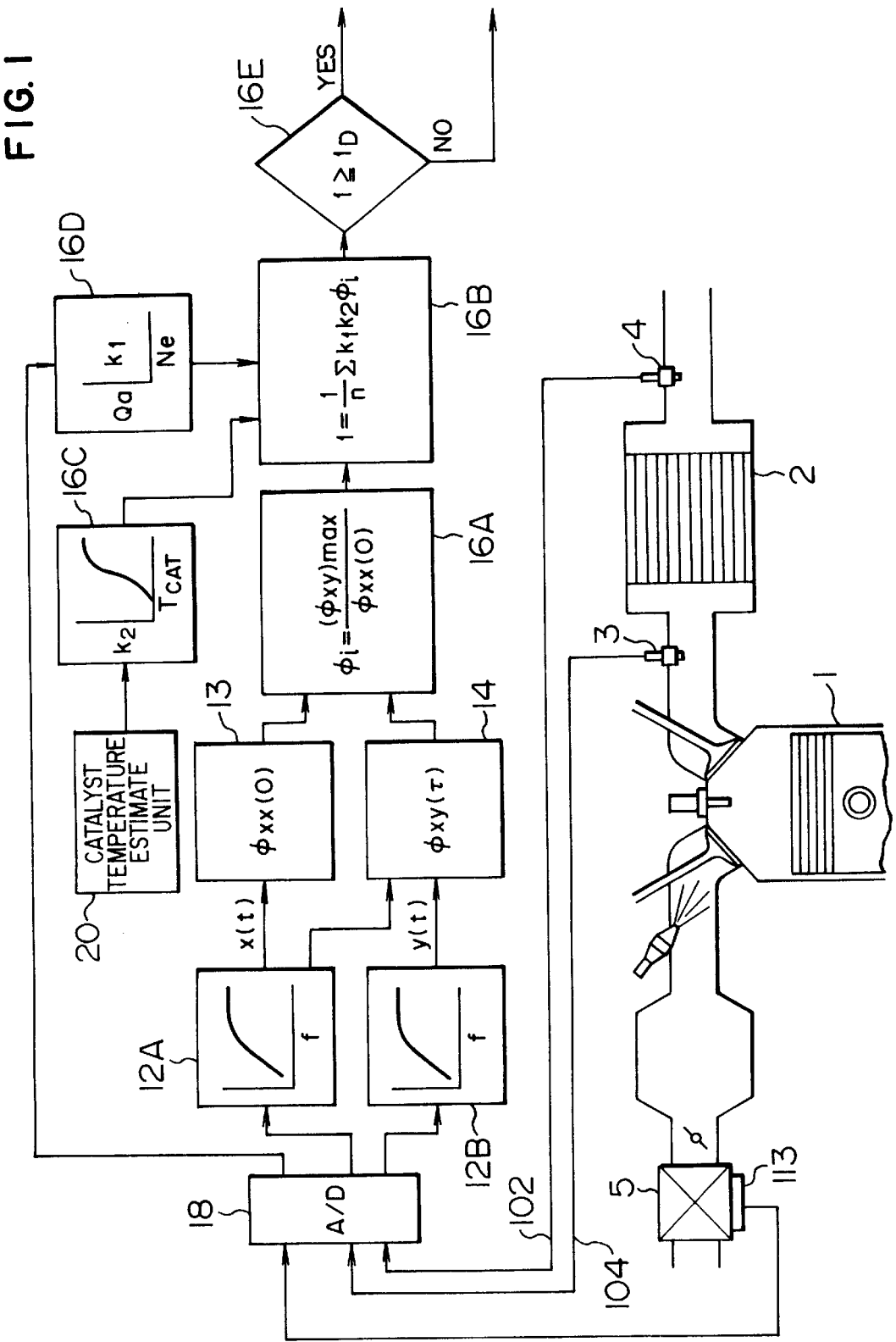
FIG. 1 is a block diagram showing schematically a configuration of an apparatus for diagnosing an engine exhaust gas purification system for illustrating the underlying concept of the present invention.

Referring to FIG. 1, the output signal 114 of the upstream $O_2$-sensor 3 (hereinafter also referred to as the upstream $O_2$-sensor signal) and the output signal 102 of the downstream $O_2$-sensor 4 (hereinafter also referred to as the downstream $O_2$-sensor signal) are converted to digital data by an analogue-to-digital or A/D converter 18 in synchronism with each other.

Subsequently, DC or lower-frequency components providing disturbance to the diagnosis are eliminated from the digital data by respective high-pass filters (see blocks 12A and 12B in FIG. 1). At this juncture, it is presumed that both the filters 12A and 12B have same characteristics. In this manner, signal components of lower frequencies than that of the signal used in the air-fuel ratio feedback control which present disturbance to the diagnosis are eliminated from both the data signals derived from the $O_2$-sensor signals 102 and 114 after the A/D conversion.

In succession, an autocorrelation function $\phi_{xx}(0)$ of a signal x(t) 105 derived from the output of the upstream $O_2$-sensor 114 is determined at a time point t(=0) (see a block 13 in FIG. 1). The reason why the autocorrelation function $\phi_{xx}(0)$ is determined is explained by the fact that the autocorrelation function $\phi_{xx}$ assumes a maximum value $(\phi_{xx})_{max}$ at the time point t(=0).

The autocorrelation function $\phi_{xx}$ can be represented by the following expression:

$$\phi_{xx}(\tau) = \int x(t)x(t-\tau)dt \quad (1)$$

Further, in a block 14 shown in FIG. 1, a cross-correlation function $\phi_{xy}(\tau)$ is determined on the basis of the signal x(t) derived from the output 114 of the upstream $O_2$-sensor 3 and a signal y(t) derived from the output 102 of the downstream $O_2$-sensor 4 for a predetermined integration interval T in accordance with $$\phi_{xy}(\tau) = \int x(t)y(t-\tau)dt \quad (2)$$

The integration interval T is previously so set that variation in the engine speed (rpm) does not derived from a predetermined range during the interval or period T.

Next, a maximum value $(\phi_{xy})_{max}$ of the cross-correlation function $\phi_{xy}(\tau)$ during the integration interval T is extracted, whereon sequential deterioration indexes given generally by $\Phi_i$ $(=(\phi_{xy})_{max}/\phi_{xx}(0))$ is determined by using the maximum value $(\phi_{xy})_{max}$ of the cross-correlation function in accordance with the under-mentioned expression (3) (see a block 16A in FIG. 1).

$$\Phi_i = (\phi_{xy})_{max}/(\phi_{xx})(0) \quad (3)$$

At this juncture, it must be pointed out that phase $\tau$ of the sequential deterioration index $\Phi_i$, i.e., the phase $\tau$ at which the value $(\phi_{xy})/\phi_{xx}(0)$ becomes maximum, varies in dependence on engine operating conditions as well as type of the engine of concern. Accordingly, the sequential deterioration index $\Phi_i$ is heuristically determined by actually analyzing the data.

The sequential deterioration index $\Phi_i$ thus determined are stored in a memory such as a random access memory (RAM), and a sequential deterioration index $\phi_{(i+1)}$ is determined for a succeeding integration interval T through a similar procedure.

After repeating the aforementioned operations a number n of times, a mean value of the sequential deterioration indexes $\Phi_i$ is arithmetically determined to be defined as an ultimate deterioration index I for the catalytic converter 2. In determining the ultimate deterioration index I, correcting coefficients $k_1$ and $k_2$ which depend on the various engine operation states are taken into account as indicated by the expression (4) mentioned below (see blocks 16B, 16C and 16D in FIG. 1). Namely, $$I = (\Sigma k_1 k_2 \Phi_i)/n \quad (4)$$

where I represents the ultimate deterioration index, $k_1$ represents a correcting coefficient based on an engine load, $k_2$ represents a correcting coefficient for taking into account the temperature of the catalytic converter, $\Phi_i$ represents the sequential deterioration indexes mentioned previously, and n represents a number of time the sequential deterioration index is determined.

Parenthetically, the correcting coefficients $k_1$, and $k_2$ may be stored in a read-only memory (ROM) in the form of map data.

Subsequently, the final deterioration index I is compared with a predetermined deterioration decision reference level $I_D$ for diagnosing the catalytic converter as to whether or not it suffers deterioration in the performance or capability. More specifically, when the final deterioration index I is greater than the deterioration decision reference level $I_D$, it is then determined that the catalytic converter is deteriorated (see block 16E in FIG. 1).

The reason why the sequential deterioration indexes are not used as they are but the mean value thereof, i.e., the ultimate deterioration index I is used in the diagnosis of the catalytic converter can be explained by the fact that the sequential deterioration index $\Phi_i$ will vary under the influence of variations or changes in the engine speed (rpm) and the engine load taking place in the course of normal running of the motor vehicle. Thus, by determining the sequential deterioration index $\Phi_i$ for each of predetermined rotation seed ranges or load ranges during a predetermined period (interval) to thereby cumulate the sequential deterioration indexes $\Phi_i$ thus obtained and by determining the mean value of the sequential deterioration indexes $\Phi_i$ as the ultimate deterioration index I, the deterioration diagnosis of the catalytic converter can be performed over the whole engine operation range. It should however be mentioned that in the case where the engine operation state is restricted to more or less extent, the deterioration diagnosis of the catalytic converter can be performed by using the sequential deterioration index $\Phi_i$ as well.

Figure 2:
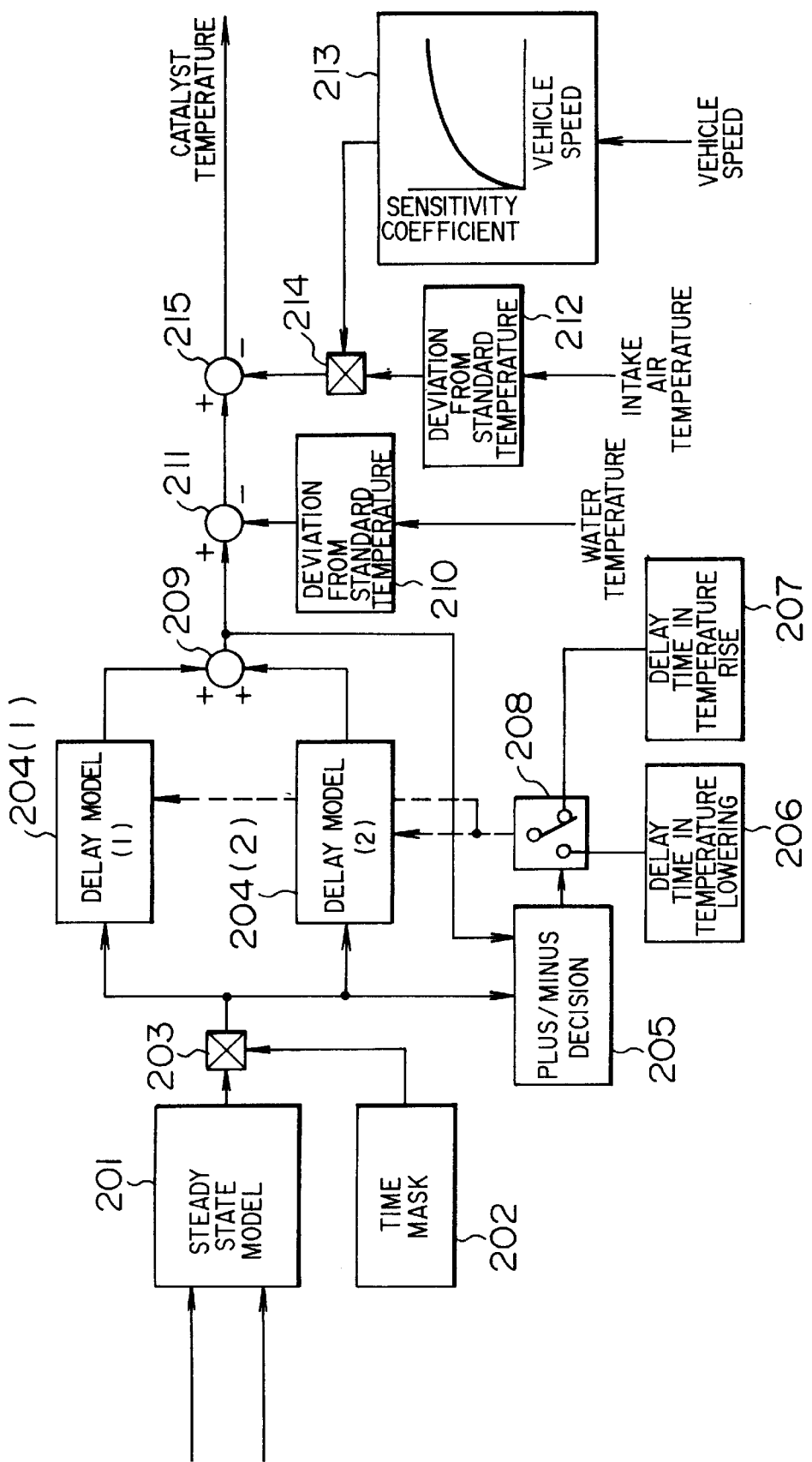
FIG. 2 shows an exemplary arrangement of a catalyst temperature estimating unit according to an embodiment of the invention.

A feature of the instant embodiment of the invention to be noticed can be seen in a facility or unit 20 for estimating the catalyst temperature $T_{CAT}$ which is taken into account in determining the correcting coefficient $k_2$ mentioned previously. FIG. 2 shows an exemplary arrangement of a catalyst temperature estimating unit 20. In the following, operation of the catalyst temperature estimating unit 20 will be elucidated by reference to FIG. 2.

At first, a steady-state catalyst temperature $T_{CAT,0}$ is determined on the basis of a steady-state model 201 which is prepared by measuring previously the catalyst temperature in a steady state of the engine speed (rpm) and the engine load (represented typically by an intake air flow) and stored in a memory in the form of data map. Alternatively, quantities of heat generated by the engine may previously be calculated as a function of the engine speed (rpm) and the engine load and stored in the form of data map.

A predetermined time mask circuit 202 is provided for outputting a signal of "0" until a predetermined overhead or dead time $t_0$ has lapsed after starting of the engine operation and thereafter outputting a signal of "1". The dead time $t_0$ is determined in dependence on the engine operation state before and after the motor vehicle is started and stored in terms of map data in association with an engine cooling water temperature $T_W$ and/or an intake air temperature $T_A$. In principle, the dead time $t_0$ is so determined as to assume a value which increases as the difference between the engine cooling water temperature $T_W$ and the intake air temperature $T_A$ becomes smaller. As an alternative method, a cumulated fuel amount value $SF_i$ is successively determined after the engine is started, and the dead time or period $t_0$ may be terminated when the cumulated fuel amount value $SF_i$ reaches a predetermined value which increases as the difference between the engine cooling water temperature $T_W$ and the intake air temperature $T_A$ becomes smaller. In this conjunction, the cumulated fuel amount value $SF_i$ may be replaced by a cumulated load value.

In any case, an output $T_{CAT,1}$ of a multiplier 203 can be expressed as follows:

$$T_{CAT,1}=T_W(t \leq t_0)$$

$$T_{CAT,1}=T_{CAT,0}(t>t_0) \quad (5)$$

In the above expression, the engine cooling water temperature $T_W$ is detected by a sensor not shown.

Delay moles 204(1) and 204(2) are arithmetically determined in accordance with the following expressions (6) and (7):

$$T_{CAT,2,1}=(1-1/\tau)T_{CAT,2,1}+\xi/\tau T_{CAT,1} \quad (6)$$

where $\xi$ represents a gain coefficient of heat transmission component and $\tau$ represents a time constant of heat transmission component.

$$T_{CAT,2,2}=(1-1/\zeta\tau)T_{CAT,2,2}+(1-\xi)\zeta\tau T_{CAT,1} \quad (7)$$

where $T_{CAT,1}$ represents the initial value of $T_{CAT,2,1}$ and $T_{CAT,2,2}$, $\zeta\tau$ represents a time constant of heat conduction component, and $(1-\xi)$ represents a gain coefficient of heat conduction component.

Figure 3:
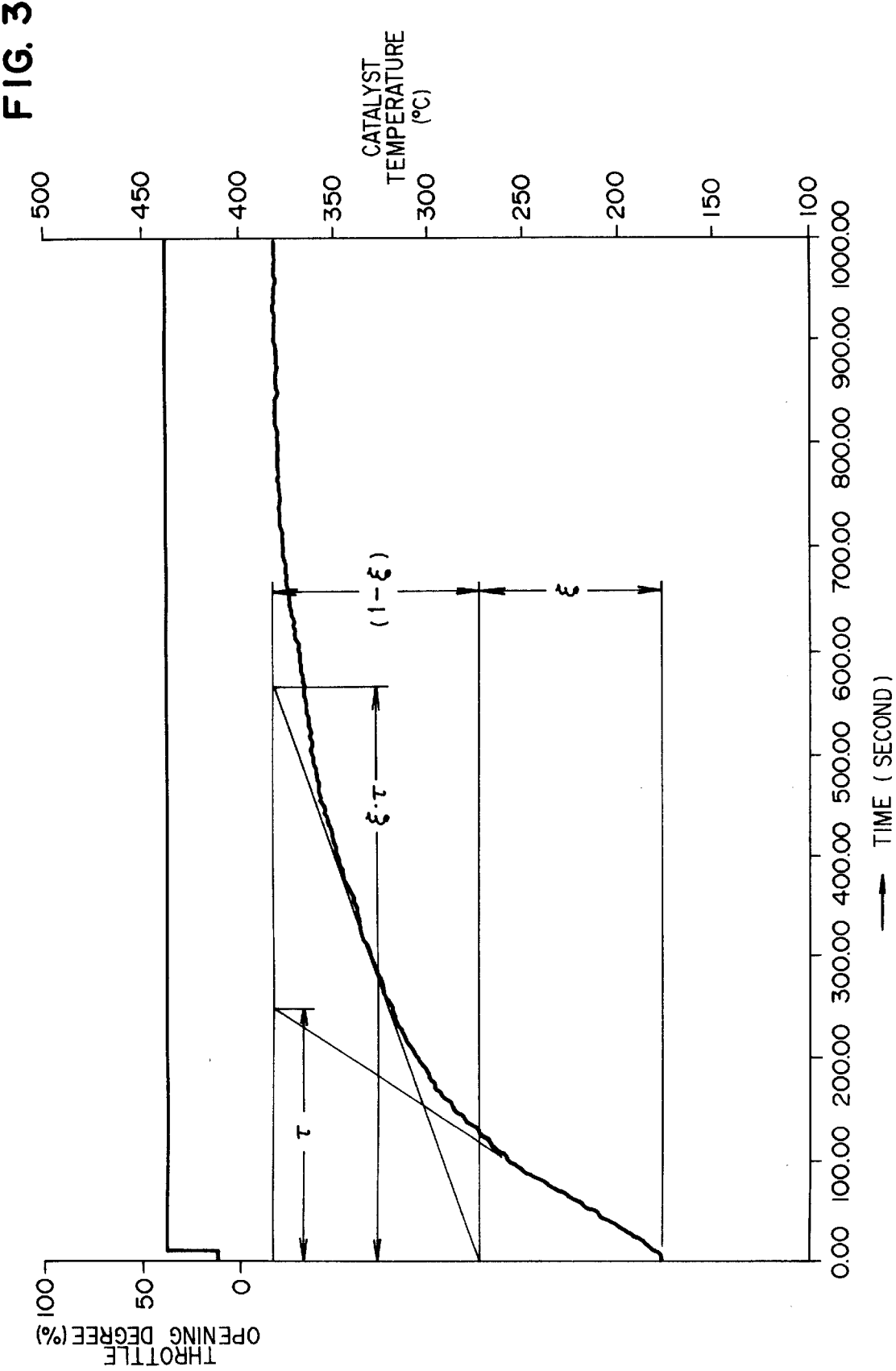
FIG. 3 is a chart for illustrating a method of determining parameters employed in the unit shown in FIG. 2.

A method of determining the parameters $\xi$ and $\zeta$ appearing in the above expressions (6) and (7) will be described. FIG. 3 shows values of the catalyst temperature measured by changing steeply the throttle valve in a stepwise manner under the same condition as the measurement in the steady-state model. The time constant intervening in the change of the catalyst temperature is measured at a plurality of points. For example, the time constant $\tau$ during the rise-up and the time constant corresponding to a product obtained by multiplying $\tau$ with $\zeta$ are determined on the presumption that $\zeta=10$. On the basis of these values, the value of $\xi$ is determined in accordance with the method illustrated in FIG. 3.

Through the procedure similar to that illustrated in FIG. 3, the delay time constant $\tau_d$ 206 intervening in lowering of the catalyst temperature where the throttle valve is closed stepwise is determined and stored separately from the delay time $\tau_u$ 207 intervening in the temperature rise. The delay times $\tau_d$ and $\tau_u$ are changed over in dependence on the output of the plus/minus decision block 205. Namely, $$\tau=\tau_u \text{ when } T_{CAT,2}-T_{CAT,1}<0, \quad (8)$$

and $$\tau=\tau_d \text{ when } T_{CAT,2}-T_{CAT,1}\geq 0. \quad (9)$$

By adding together the outputs of first and second delay models 204(1) and 204(2), an estimated catalyst temperature $T_{CAT,3}$ is determined in accordance with the following expression:

$$T_{CAT,3}=T_{CAT,2,1}+T_{CAT,2,2} \quad (10)$$

Subsequently, the estimated catalyst temperature $T_{CAT,3}$ is corrected in consideration of the engine cooling water temperature $T_W$, the intake air temperature $T_A$ and the vehicle speed $V_{SP}$ detected by associated sensors (not shown) in accordance with the under-mentioned expressions (11) and (12):

$$T_{CAT,4}=T_{CAT,3}-(T_W-T_{W,0}) \quad (11)$$

where $T_{W,0}$ represents the engine cooling water temperature $T_W$ as measured in the steady-state model, $$T_{CAT,5}=T_{CAT,4}-\eta(T_A-T_{A,0}) \quad (12)$$

where $T_{A,0}$ represents the intake air temperature $T_A$ as measured in the steady-state model, and $\eta$ represents a sensitivity coefficient set previously as a function of the vehicle speed. Namely, $$\eta=F(V_{sp}) \quad (13)$$

The vehicle speed function $F(V_{sp})$ is stored in the form of experimentally determined expression or map data by measuring the catalyst temperature upon change of the vehicle speed or air flow rate under the same conditions as the measurement of the intake air temperature in the steady-state model.

Figure 4:
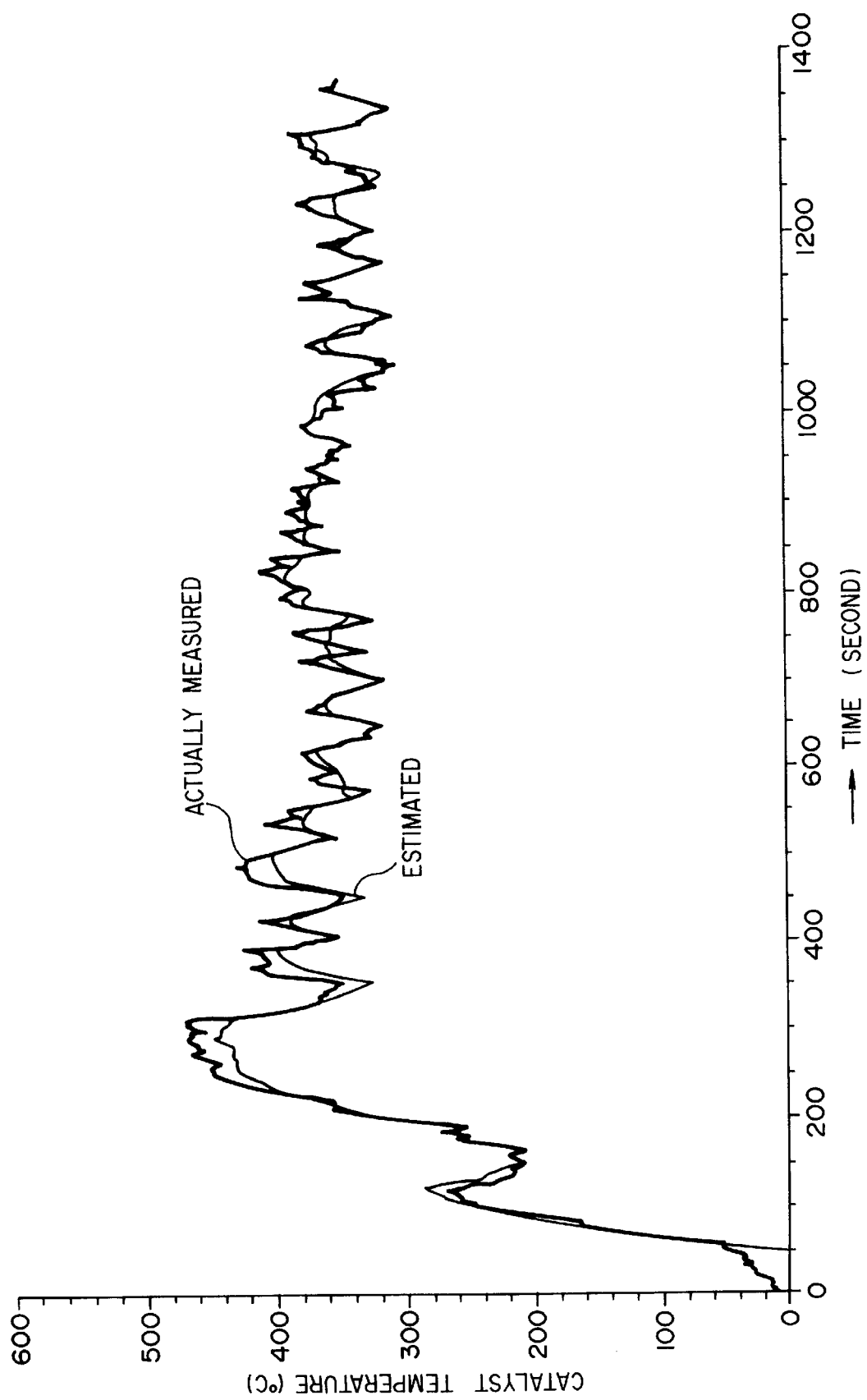
FIG. 4 is a characteristic diagram for illustrating a catalyst temperature estimating process.

FIG. 4 shows the results of an experiment with the catalyst temperature estimating method according to the present invention. This experiment was made in a vehicle running mode of the United States test procedure. The ordinate represents the catalyst temperature, and the abscissa indicates elapsed time from a cold start of a vehicle. The bold line represents actual catalyst temperature measured by a temperature sensor, and the thin line represents the estimated catalyst temperature. It is clearly apparent that the estimated catalyst temperature is almost coincident with the actual catalyst temperature without delay.

What is claimed is:

1. A method of estimating a temperature of a catalyst of an exhaust gas purification system in an internal combustion engine of a motor vehicle having an air-fuel ratio control system wherein a fuel injection is controlled to maintain the air-fuel ratio in a predetermined value, comprising the steps of (a) estimating a catalyst temperature in a steady-state based on engine speed and intake air flow rate; and
 (b) estimating a catalyst temperature in a transient state by correcting said estimated catalyst temperature in a steady-state with a heat transfer delay model including parameters of heat transmission component and heat conduction component.

2. The method according to claim 1, further comprising the step of (c) correcting said estimated catalyst temperature in a transient state based on vehicle speed and intake air temperature.

3. The method according to claim 1, further comprising the step of (d) using a predetermined value as said estimated catalyst temperature of a steady-state in a predetermined time period after engine starting.

* * * * *